(12) United States Patent
Jung et al.

(10) Patent No.: US 11,024,176 B2
(45) Date of Patent: Jun. 1, 2021

(54) COLLISION AVOIDANCE CONTROL SYSTEM AND METHOD

(71) Applicants: Hyundai Motor Company, Seoul (KR); Kia Motors Corporation, Seoul (KR)

(72) Inventors: Chang Young Jung, Seoul (KR); Byoung Kwang Kim, Gyeonggi-do (KR); Su Rim Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 251 days.

(21) Appl. No.: 16/204,329

(22) Filed: Nov. 29, 2018

(65) Prior Publication Data
US 2020/0074863 A1 Mar. 5, 2020

(30) Foreign Application Priority Data
Aug. 31, 2018 (KR) .................. 10-2018-0103547

(51) Int. Cl.
*G08G 1/16* (2006.01)
*B60W 30/09* (2012.01)
(Continued)

(52) U.S. Cl.
CPC .............. *G08G 1/166* (2013.01); *B60W 30/09* (2013.01); *B60W 30/0956* (2013.01);
(Continued)

(58) Field of Classification Search
CPC ......... B60W 2420/42; B60W 2552/30; B60W 2554/4041; B60W 2554/4042;
(Continued)

(56) References Cited

U.S. PATENT DOCUMENTS 5,572,428 A * 11/1996 Ishida ............. B60W 30/18145
701/301
6,067,031 A * 5/2000 Janky .................... G01S 13/931
340/903
(Continued)

FOREIGN PATENT DOCUMENTS

KR 101414571 B1 * 8/2014
KR 101414571 B1 8/2014

*Primary Examiner* — Angelina Shudy
(74) *Attorney, Agent, or Firm* — Mintz Levin Cohn Ferris Glovsky and Popeo, P.C.; Peter F. Corless (57) ABSTRACT

A collision avoidance control system and method are provided. The system includes a GPS receiver that obtains location information of a vehicle, a navigation system having map information, and a sensor unit that senses a target vehicle located near a roundabout. The sensor obtains traveling information of the target vehicle and forward view image information of the vehicle. A controller then calculates an estimated collision point based on the map information, the location information of the vehicle and the traveling information of the target vehicle to determine a risk of collision based on an absolute value of a difference between an arrival time of the vehicle to the estimated collision point and an arrival time of the target vehicle to the estimated collision point. The speed of the vehicle is then adjusted in response to the determined risk of collision.

18 Claims, 6 Drawing Sheets

(51) Int. Cl.
*B60W 30/095* (2012.01)
*G01S 13/86* (2006.01)
*G01S 13/931* (2020.01)
*G01S 17/86* (2020.01)
*G01S 17/931* (2020.01)

(52) U.S. Cl.
CPC .......... *G01S 13/865* (2013.01); *G01S 13/867* (2013.01); *G01S 13/931* (2013.01); *G01S 17/86* (2020.01); *G01S 17/931* (2020.01); *G08G 1/164* (2013.01); *G01S 2013/9316* (2020.01); *G01S 2013/9321* (2013.01); *G01S 2013/9322* (2020.01)

(58) Field of Classification Search
CPC ....... B60W 2554/802; B60W 2556/40; B60W 2556/50; B60W 2720/10; B60W 30/09; B60W 30/0953; B60W 30/0956; B60W 30/18159; B60W 30/085; B60W 30/095; B60W 60/001; B60W 60/0011; B60W 60/0015; G01S 13/865; G01S 13/867; G01S 13/931; G01S 17/86; G01S 17/931; G01S 2013/9316; G01S 2013/9321; G01S 2013/9322; G08G 1/164; G08G 1/166
See application file for complete search history.

(56) References Cited

U.S. PATENT DOCUMENTS

| | | | | |
|---|---|---|---|---|
| 6,084,508 | A * | 7/2000 | Mai | B60T 7/22 340/435 |
| 6,445,308 | B1 * | 9/2002 | Koike | G01S 11/04 340/902 |
| 7,145,441 | B2 * | 12/2006 | Knoop | B60Q 9/008 340/435 |
| 7,209,051 | B2 * | 4/2007 | Shankwitz | G06F 16/29 340/938 |
| 7,409,295 | B2 * | 8/2008 | Paradie | G06T 7/70 701/301 |
| 8,250,695 | B2 * | 8/2012 | Karuppiah | B08B 1/04 15/77 |
| 8,577,550 | B2 * | 11/2013 | Lu | B60W 10/20 701/41 |
| 8,818,703 | B2 * | 8/2014 | Harada | B60R 21/0134 701/301 |
| 8,860,564 | B2 * | 10/2014 | Rubin | G08G 1/0969 340/436 |
| 9,187,091 | B2 * | 11/2015 | Mills | B60W 10/18 |
| 9,650,040 | B2 * | 5/2017 | Minemura | G01S 13/867 |
| 9,691,282 | B2 * | 6/2017 | Hartmann | B60W 10/20 |
| 9,738,315 | B2 * | 8/2017 | Yoon | G08G 1/168 |
| 9,784,831 | B2 * | 10/2017 | Kuo | G01S 13/931 |
| 9,798,011 | B2 * | 10/2017 | MacGougan | G01Q 19/40 |
| 10,011,277 | B2 * | 7/2018 | Meinhart | B60T 7/22 |
| 10,266,175 | B2 * | 4/2019 | Miller | B62D 15/0265 |
| 10,268,197 | B2 * | 4/2019 | Nilsson | G05D 1/0212 |
| 10,268,909 | B2 * | 4/2019 | Sathyanarayana | G06K 9/6218 |
| 10,403,145 | B2 * | 9/2019 | Deng | G08G 1/166 |
| 10,486,707 | B2 * | 11/2019 | Zelman | G08G 1/166 |
| 10,818,184 | B2 * | 10/2020 | Han | G06N 20/10 |
| 2002/0097170 | A1 * | 7/2002 | Yasui | G08G 1/166 340/988 |
| 2003/0016143 | A1 * | 1/2003 | Ghazarian | G08G 1/164 340/901 |
| 2004/0019420 | A1 * | 1/2004 | Rao | B60R 21/0132 701/45 |
| 2006/0274149 | A1 * | 12/2006 | Yoshizawa | G01S 13/867 348/148 |
| 2007/0005609 | A1 * | 1/2007 | Breed | B60N 2/2863 |
| 2008/0306666 | A1 * | 12/2008 | Zeng | B60Q 9/006 701/70 |
| 2009/0143951 | A1 * | 6/2009 | Takahashi | B60T 7/22 701/70 |
| 2010/0185411 | A1 * | 7/2010 | Pfeiffer | G08G 1/01 702/150 |
| 2011/0082623 | A1 * | 4/2011 | Lu | B60W 30/09 701/41 |
| 2011/0298603 | A1 * | 12/2011 | King | G08G 1/042 340/436 |
| 2011/0301845 | A1 * | 12/2011 | Harada | B60R 21/0134 701/301 |
| 2011/0313665 | A1 * | 12/2011 | Lueke | G01S 13/931 701/301 |
| 2012/0035846 | A1 * | 2/2012 | Sakamoto | G08G 1/166 701/301 |
| 2013/0279491 | A1 * | 10/2013 | Rubin | H04W 76/50 370/347 |
| 2014/0032049 | A1 * | 1/2014 | Moshchuk | G08G 1/166 701/42 |
| 2014/0303882 | A1 * | 10/2014 | Jang | G08G 1/166 701/119 |
| 2014/0324286 | A1 * | 10/2014 | Tsuchida | G08G 1/167 701/36 |
| 2014/0347207 | A1 * | 11/2014 | Zeng | G01S 13/87 342/71 |
| 2015/0353078 | A1 * | 12/2015 | Kaminade | B60W 30/0956 701/1 |
| 2016/0016561 | A1 * | 1/2016 | Lee | G01S 13/867 701/70 |
| 2016/0091897 | A1 * | 3/2016 | Nilsson | B60W 30/16 701/25 |
| 2016/0362104 | A1 * | 12/2016 | Miller | B60W 30/08 |
| 2016/0368492 | A1 * | 12/2016 | Al-Stouhi | G08G 1/162 |
| 2017/0113665 | A1 * | 4/2017 | Mudalige | G08G 1/166 |
| 2017/0154531 | A1 * | 6/2017 | Funabashi | G01C 21/30 |
| 2017/0330464 | A1 * | 11/2017 | Yoo | B60T 7/22 |
| 2018/0151073 | A1 * | 5/2018 | Minemura | G01S 13/93 |
| 2018/0178722 | A1 * | 6/2018 | Ohta | G06T 7/593 |
| 2018/0251092 | A1 * | 9/2018 | Lee | G01S 13/60 |
| 2018/0261094 | A1 * | 9/2018 | Nishimura | H04N 7/183 |
| 2018/0268227 | A1 * | 9/2018 | Nakada | G06T 3/40 |
| 2018/0284791 | A1 * | 10/2018 | Furukawa | G05D 1/0214 |
| 2018/0304889 | A1 * | 10/2018 | Shalev-Shwartz | G06N 5/046 |
| 2018/0339670 | A1 * | 11/2018 | Nishimura | G08G 1/165 |
| 2018/0354555 | A1 * | 12/2018 | Sheng | B62D 15/0265 |
| 2019/0092343 | A1 * | 3/2019 | Hoshikawa | B60W 50/10 |
| 2019/0152523 | A1 * | 5/2019 | Hajika | B60W 30/12 |
| 2019/0256144 | A1 * | 8/2019 | Yamada | B62D 15/0285 |
| 2020/0005645 | A1 * | 1/2020 | Wray | G08G 1/096758 |
| 2020/0073977 | A1 * | 3/2020 | Montemerlo | G08G 1/096833 |
| 2020/0086855 | A1 * | 3/2020 | Packer | G08G 1/161 |
| 2020/0118441 | A1 * | 4/2020 | Han | G06N 20/10 |
| 2020/0249674 | A1 * | 8/2020 | Dally | G06N 3/08 |
| 2020/0255001 | A1 * | 8/2020 | Rayalsamy | B60W 30/0953 |

* cited by examiner

COLLISION AVOIDANCE CONTROL SYSTEM AND METHOD

CROSS REFERENCE TO RELATED APPLICATION(S)

This application claims the benefit of Korean Patent Application No. 10-2018-0103547, filed on Aug. 31, 2018, which is hereby incorporated by reference as if fully set forth herein.

BACKGROUND

Field of the Invention

The present invention relates to a collision avoidance control system and method and more particularly, to a collision avoidance control system and method that avoid a collision when a vehicle is being driven through a roundabout.

Discussion of the Related Art

Recently, safety devices for preventing various types of accidents, which may occur while a vehicle is being driven, have been developed and installed within vehicles. Examples of these safety devices include a head-on collision warning device, which outputs a warning regarding a risk of collision between a host vehicle and a preceding vehicle, and an intersection collision avoidance system, which predicts a collision between vehicles at an intersection. In particular, the intersection collision avoidance system calculates a traveling route of a host vehicle, estimates an intersection passing time, and transmits the calculated traveling route and the estimated intersection passing time to other vehicles via a vehicle-to-everything (V2X) network, thereby predicting and providing a warning of the possibility of a collision.

However, at a roundabout, other vehicles approach a host vehicle from the forward-side region of the host vehicle in a lateral direction. Thus, a roundabout collision avoidance system requires a collision determination method different from that of the conventional head-on collision warning device. Further, since no traffic light is present at a roundabout, a vehicle collision may not be avoided merely through collision prediction and warning. In addition, the conventional intersection collision avoidance system is capable of being utilized only in pre-constructed spaces or areas, still allows a risk of collision with other vehicles, which do not support inter-vehicle communication, among a plurality of vehicles traveling through the intersection, and is limitedly able to cope with vehicles traveling through a roundabout.

SUMMARY

Accordingly, the present invention is directed to a collision avoidance control system and method that substantially obviate one or more problems due to limitations and disadvantages of the related art. An object of the present invention is to provide a system and method for avoiding a collision when a vehicle enters or travels through a roundabout by determining a risk of collision between the vehicle and other vehicles regardless of support of a V2X network function and by establishing a different driving strategy of the vehicle based on the determined risk of collision.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a collision avoidance control system may include a global positioning system (GPS) receiver configured to obtain location information of a vehicle, a navigation system in which map information is stored, a controller configured to receive the location information of the vehicle and the map information from the GPS receiver and the navigation system, and a sensor unit configured to sense at least one target vehicle located adjacent to a roundabout and to obtain traveling information of the target vehicle, including at least one of a distance to the target vehicle, a location of the target vehicle, or a speed of the target vehicle, and forward view image information of the vehicle.

Additionally, the controller may be configured to calculate an estimated collision point based on the map information, the location information of the vehicle and the traveling information of the target vehicle, determine a risk of collision based on an absolute value of a difference between a first arrival time of the vehicle to the calculated estimated collision point and a second arrival time of the target vehicle to the calculated estimated collision point, and adjust the speed of the vehicle in response to the determined risk of collision.

The controller may further be configured to estimate a traveling path of the vehicle and a traveling path of the target vehicle based on the map information and calculate the estimated collision point using a point at which the traveling path of the vehicle and the traveling path of the target vehicle meet. The controller may be configured to extract a plurality of feature points with respect to respective corners of the target vehicle from image information obtained from the sensor unit and calculate a plurality of second arrival time values required for the extracted plurality of feature points to reach the estimated collision point.

When the target vehicle has an overall length greater than a predetermined length, the controller may be configured to calculate at least one interpolation point through linear interpolation with respect to the extracted plurality of feature points and calculate a plurality of second arrival time values required for the extracted plurality of feature points and the calculated at least one interpolation point to reach the estimated collision point.

The risk of collision may be determined based on the minimum value of absolute values of differences between the second arrival time values and the first arrival time. When the target vehicle is traveling through the roundabout, the controller may be configured to determine whether the roundabout is present ahead of the vehicle by applying the location information, received through the GPS receiver at predetermined time intervals, to the map information extracted from the navigation system.

The controller may be configured to determine the risk of collision when the vehicle is located within a region spaced apart from an entry boundary line of the roundabout by a predetermined distance. The controller may be configured to allow the vehicle to enter the roundabout when the minimum value is greater than a predetermined first reference value. The controller may also be configured to prohibit the vehicle from entering the roundabout when the minimum value is less than the first reference value.

When the target vehicle is expected to enter the roundabout, the controller may be configured to decelerate or brake the vehicle traveling through the roundabout when the minimum value is less than a predetermined second reference value. The second reference value may be less than a first reference value, which is a criterion used to determine the risk of collision when the vehicle enters the roundabout.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments will be described in detail with reference to the accompanying drawings. While the disclosure is subject to various modifications and alternative forms, specific exemplary embodiments thereof are shown by way of example in the drawings and are explained in detail in the description. However, the disclosure should not be construed as being limited to the exemplary embodiments set forth herein, but on the contrary, the disclosure is intended to cover all modifications, equivalents, and alternatives falling within the spirit and scope of the exemplary embodiments.

It may be understood that, although the terms "first," "second," etc. may be used herein to describe various elements, these elements are not to be construed as being limited by these terms. These terms are generally only used to distinguish one element from another. In addition, terms particularly defined in consideration of the construction and operation of the exemplary embodiments are used only to describe the embodiments, but do not define the scope of the exemplary embodiments.

The terminology used herein is for the purpose of describing particular embodiments only and is not intended to be limiting of exemplary embodiments of the invention. Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, a vehicle collision avoidance control system for traveling through a roundabout according to an exemplary embodiment of the present invention will be described with reference to the accompanying drawings.

Figure 1:
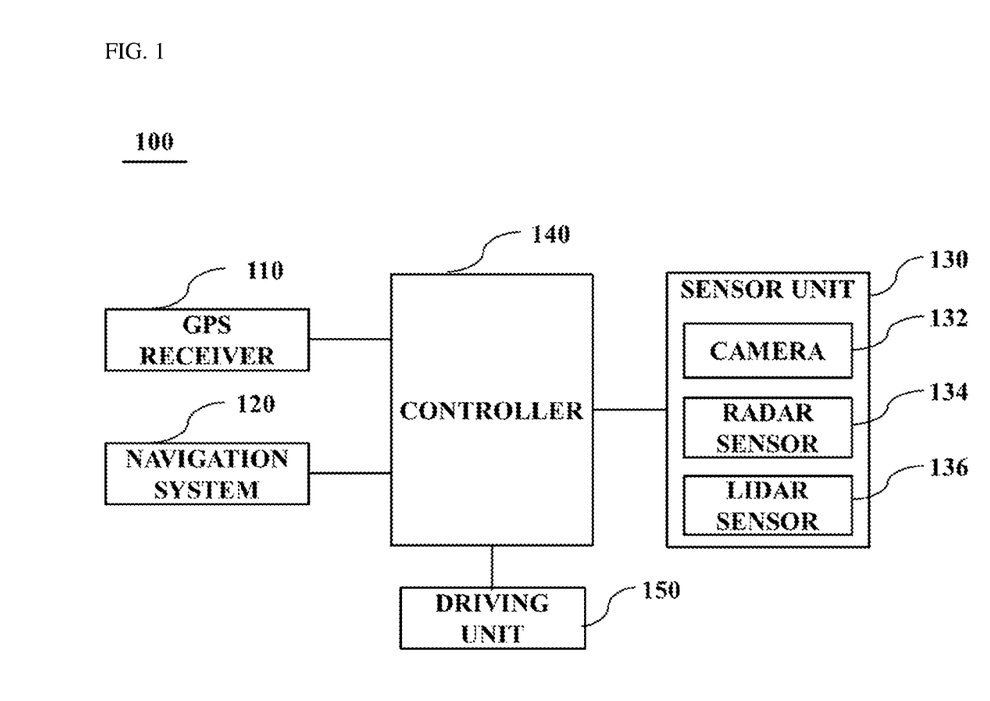
FIG. 1 is a block diagram schematically showing the configuration of a collision avoidance control system according to an exemplary embodiment of the present invention.

FIG. 1 is a block diagram schematically showing the configuration of a collision avoidance control system for traveling through a roundabout according to an exemplary embodiment of the present invention. As shown in FIG. 1, a collision avoidance control system 100 according to an exemplary embodiment may include a global positioning system (GPS) receiver 110, a navigation system 120, a sensor unit 130, a controller 140, and a driving unit 150. The controller 140 may be configured to operate the other components of the system 100.

In particular, the GPS receiver 110 may be configured to receive a navigation message from at least one GPS satellite located above the earth to obtain the location information of a vehicle. The current location coordinates of a vehicle may be obtained by measuring a delay time of a radio wave emitted from the GPS satellite. The navigation system 120 may include a database in which map information regarding a nationwide map and route guidance data associated with the map information are built. The map information may include road information (e.g. curves, bumps, neighboring buildings, school zones, number of lanes, speed limit, slope, accident black spots, traffic lights, one-way traffic, etc.), route guidance data, road divergence information, and intersection information (e.g. the type of intersection and possible turning direction depending on a crossing type).

The sensor unit 130 may include a camera 132, configured to sense an object ahead of a vehicle by obtaining and processing image information of the object using an optical system, a radio detection and ranging (radar) sensor 134, configured to sense the distance to an object and the speed and angle thereof using an electromagnetic wave, and a light detection and ranging (lidar) sensor 136, configured to monitor a blind spot, which cannot be observed by the radar sensor, using light. The sensor unit 130 may be configured to sense a target vehicle located within a predetermined forward range FR of a vehicle using at least one of the above-described sensors 132, 134 and 136, and collect the image information and traveling information of the target vehicle.

The controller 140 may be configured to receive the location information of the vehicle, the map information, and the image information or traveling information of the target vehicle from the GPS receiver 110, the navigation system 120, and the sensor unit 130, respectively, via controller area network (CAN) communication. The controller 140 may then be configured to calculate an estimated collision point between the vehicle and the target vehicle at a roundabout based on the received location information of the vehicle, the received map information and the received image information or traveling information of the target vehicle.

In addition, the controller 140 may be configured to determine a risk of collision based on a difference between an arrival time of the vehicle to the calculated estimated collision point and an arrival time of the target vehicle to the calculated estimated collision point, and establish a driving strategy of the vehicle (e.g. traveling control for avoiding a collision with the target vehicle when entering, traveling through, or exiting a roundabout) based on the determined risk of collision. The driving unit 150 may include devices, such as an engine, a throttle valve, a transmission, a brake, and the like, which influence the traveling speed of the vehicle. These devices may be respectively operated based on the driving strategy established by the controller 140.

Figure 2:
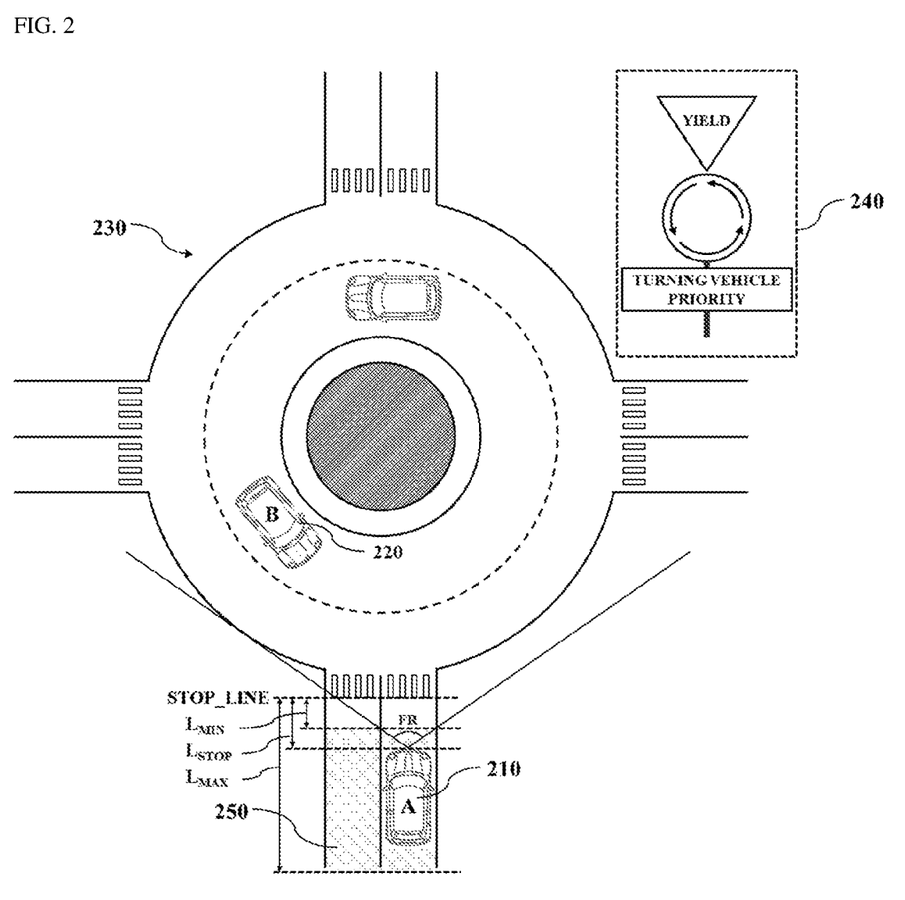
FIG. 2 is a view showing the situation before a vehicle enters a roundabout according to an exemplary embodiment of the present invention.

Hereinafter, the operation of the controller in situations in which a vehicle enters, travels through, and exits a roundabout will be described in more detail with reference to FIGS. 2 to 5. FIG. 2 is a view showing the situation before a vehicle enters a roundabout according to an exemplary embodiment of the present invention. Referring to FIG. 2, the controller 140 may first be configured to determine whether a roundabout 230 is present ahead (or in the traveling path) of a host vehicle (A) 210.

In one example, the controller 140 may be configured to determine the presence or absence of the roundabout 230 ahead of the host or subject vehicle 210 by applying the current location information of the host vehicle 210, which is received via the GPS receiver 110 at predetermined time intervals, to the map information extracted from the navigation system 120. In another example, upon sensing a predetermined traffic sign 240 from the forward view image information of the host vehicle 210, which is periodically received from the sensor unit 130, the controller 140 may be configured to determine that the roundabout 230 is present in the traveling path of the host vehicle 210.

In response to determining that the roundabout 230 is present ahead of the host vehicle 210, to determine the risk of collision between the host vehicle 210 and a target vehicle (B) 220, the controller 140 may be configured to determine whether the host vehicle 210 has currently reached a predetermined region 250 immediately before an entry boundary line or a stop line STOP_LINE of the roundabout 230. Particularly, the predetermined region 250 may be a region that is spaced apart from the entry boundary line STOP_LINE of the roundabout 230 by a distance equal to or greater than a first distance $L_{min}$ and equal to or less than a second distance $L_{max}$. The first distance $L_{min}$ may be a minimum margin distance for assuring a safe distance, and the second distance $L_{max}$ may be a distance calculated based on the average time required for the controller 140 to determine a risk of collision and establish a driving strategy and based on the speed of the host vehicle 210. The second distance $L_{max}$ may be additionally set in consideration of the overall length of the host vehicle 210. However, the present invention is not limited thereto.

When the distance $L_{stop}$ between the current location of the host vehicle 210 and the entry boundary line STOP_LINE of the roundabout 230 is less than the first distance $L_{min}$, the braking distance of the host vehicle 210 may be greater than the distance $L_{stop}$ therebetween. In particular, the host vehicle 210 may be allowed to enter the roundabout 230. When the distance $L_{stop}$ between the current location of the host vehicle 210 and the entry boundary line STOP_LINE of the roundabout 230 is greater than the second distance $L_{max}$, pre-established logic for determining a risk of collision between the host vehicle 210 and the target vehicle 220 may not be executed.

When the distance $L_{stop}$ between the current location of the host vehicle 210 and the entry boundary line STOP_LINE of the roundabout 230 is within the predetermined region 250 between the first distance $L_{min}$ and the second distance $L_{max}$, the controller 140 may be configured to reduce the speed of the host vehicle 210 to a predetermined level or less, and the sensor unit 130 may be configured to sense at least one target vehicle 220, which is traveling through the roundabout 230 within a predetermined forward range FR of the host vehicle 210, through at least one of the sensors 132, 134 and 136.

Thereafter, the logic for determining the risk of collision between the host vehicle 210 and the target vehicle 220 may be executed. Hereinafter, a process of calculating an estimated collision point required to determine a risk of collision between the host vehicle 210 and the target vehicle 220 will be described with reference to FIG. 3.

Figure 3:
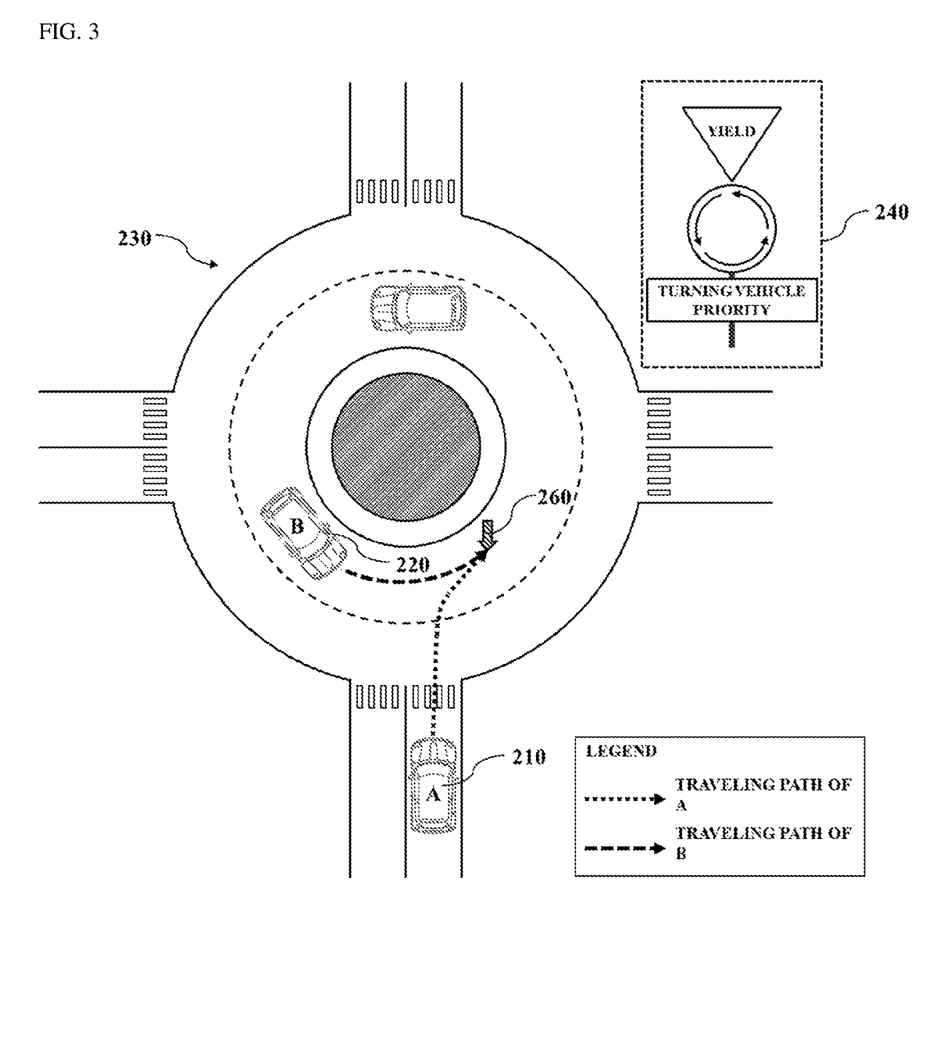
FIG. 3 is a view showing a process of calculating an estimated collision point according to an exemplary embodiment of the present invention.

FIG. 3 is a view showing the process of calculating an estimated collision point according to an exemplary embodiment of the present invention. Referring to FIG. 3, the controller 140 may be configured to estimate the traveling path of the host vehicle 210 and the traveling path of the target vehicle 220 based on the map information, and calculate an estimated collision point 260 using a point at which the traveling path of the host vehicle 210 and the traveling path of the target vehicle 220 meet.

Particularly, the traveling path of the host vehicle 210 may be estimated based on the location information (e.g. the location coordinates), which is received via the GPS receiver 110 at predetermined time intervals. The traveling direction of the host vehicle 210 may be calculated based on variation per unit time of the heading coordinates of the host vehicle 210, which is included in the location information, and the traveling path of the host vehicle 210 may be estimated by applying the calculated traveling direction to the map information.

In addition, the traveling path of the target vehicle 220 may be estimated based on the traveling information of the target vehicle 220, periodically received from the radar sensor 134 and/or the lidar sensor 136 of the sensor unit 130. Particularly, the traveling direction of the target vehicle 220 may be calculated based on variation per unit time of a distance to the target vehicle 220, an angle with the target vehicle 220, etc., which are included in the traveling information, and the traveling path of the target vehicle 220 may be estimated by applying or mapping the calculated traveling direction to the map information.

As shown in FIG. 3, the controller 140 may be configured to calculate the estimated collision point 260 using a point at which the estimated traveling path of the host vehicle 210 and the estimated traveling path of the target vehicle 220 meet or a point at which an imaginary line that extends from the traveling path of the host vehicle 210 and an imaginary line that extends from the traveling path of the target vehicle 220 meet (e.g., intersect).

When the estimated collision point 260 is calculated, the controller 140 may be configured to determine a risk of collision by calculating a first arrival time of the host vehicle 210 to the estimated collision point 260 and a second arrival time of the target vehicle 220 to the estimated collision point 260. To calculate the first arrival time of the host vehicle 210 and the second arrival time of the target vehicle 220, the traveling speed of each of the host vehicle 210 and the target vehicle 220 or the traveling path distance thereof to the estimated collision point 260 is required. This will be described in more detail with reference to FIGS. 4A and 4B.

Figure 4A:
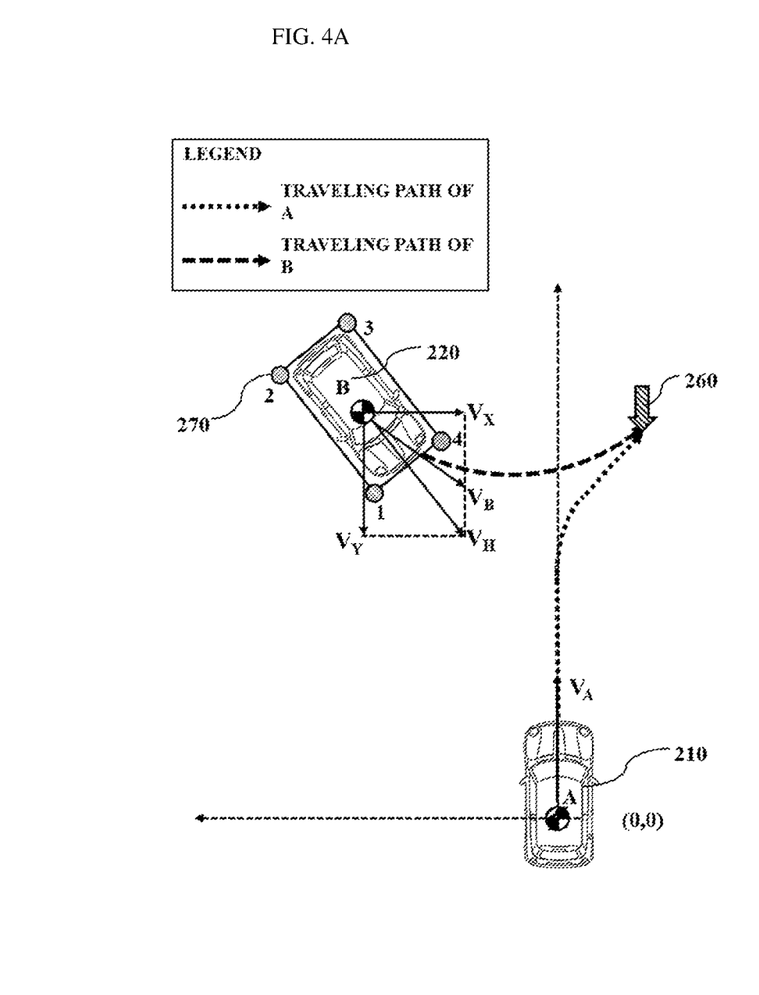
FIG. 4A is a view showing a process of determining a risk of collision according to an exemplary embodiment of the present invention.
Figure 4B:
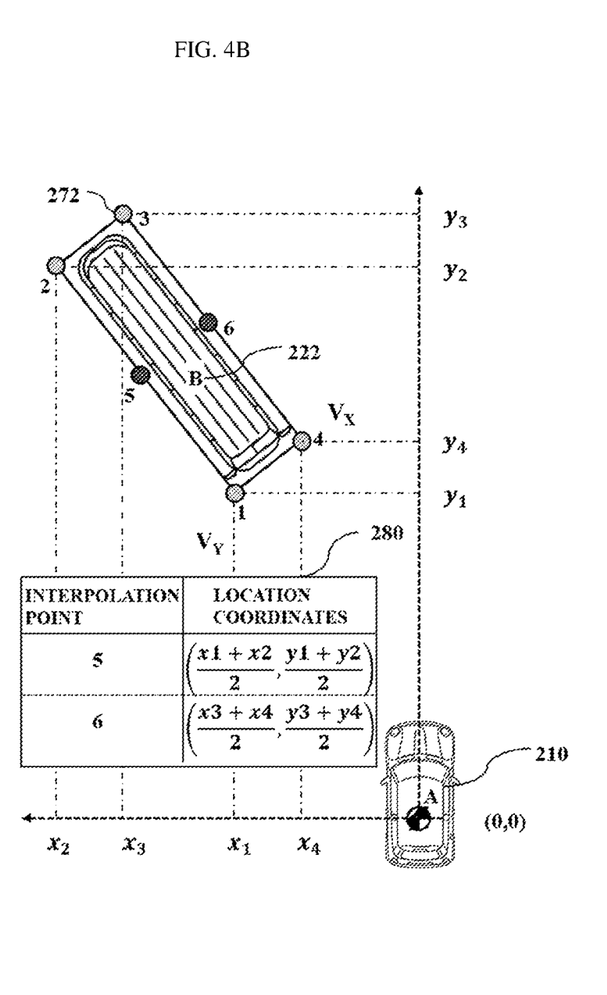
FIG. 4B is a view showing a process of calculating an interpolation point of a target vehicle having a predetermined size or greater according to an exemplary embodiment of the present invention.

FIG. 4A is a view showing a process of determining a risk of collision according to an exemplary embodiment of the present invention, and FIG. 4B is a view showing a process of calculating an interpolation point of a target vehicle having a predetermined size or greater according to an exemplary embodiment of the present invention.

The traveling speed $V_A$ of the host vehicle 210 may be calculated using the location information received from the GPS receiver 110, e.g. variation per unit time of the location. Alternatively, the traveling speed $V_A$ may be obtained using a speed sensor (not shown) installed within the host vehicle 210. The traveling speed $V_B$ of the target vehicle 220, as shown in FIG. 4A, may be calculated by correcting the speed $V_H$ of the target vehicle 220, received from the sensor unit 130, based on the local coordinate system of the host vehicle 210.

Since the roundabout 230 has a particular radius of curvature and the target vehicle 220 travels along the traveling path affected by the radius of curvature of the roundabout 230, the y-component vector value of the speed $V_H$ of the target vehicle 220 received from the sensor unit 130 may change continuously. Accordingly, to correct the y-component vector value, which changes, it may be required to calculate the traveling speed $V_B$ by projecting the speed $V_H$ of the target vehicle 220 received from the sensor unit 130 onto the traveling path mapped to the map information.

In particular, the controller 140 may be configured to set the location coordinate value of the host vehicle 210 to the origin (0,0) in the x-y coordinate system, decompose the speed $V_H$ of the target vehicle 220, received from the sensor unit 130, into x-component and y-component vectors $V_x$ and $V_y$, and calculate the traveling speed $V_B$ by projecting the vectors onto the traveling path mapped to the map information. The vector of the corrected traveling speed $V_B$ may be the same as the tangential direction of the traveling path.

In addition, the controller 140 may be configured to calculate a traveling path distance to the estimated collision point 260, and calculate an arrival time using a ratio of the traveling path distance to the traveling speed. A first arrival time $T_A$ of the host vehicle 210 may be calculated using a ratio of a traveling path distance LA, from the current location to the estimated collision point 260, to the traveling speed $V_A$ of the host vehicle 210. The first arrival time $T_A$ may be expressed using the following Equation 1.

$$T_A = \frac{L_A}{V_A} \quad \text{Equation 1}$$

A second arrival time $T_B$ of the target vehicle 220 may be calculated by extracting a plurality of feature points with respect to the respective corners of the target vehicle 220. Referring to FIG. 4A, the controller 140 may be configured to extract the feature points 270 with respect to the respective corners 1, 2, 3 and 4 of the target vehicle 220 from the image information obtained from the sensor unit 130, and calculate traveling path distances $L_{B\_1}$, $L_{B\_2}$, $L_{B\_3}$ and $L_{B\_4}$ from the respective extracted feature points 270 to the estimated collision point 260.

Accordingly, the second arrival time $T_B$ of the target vehicle 220 may include a plurality of second arrival time values $T_{B\_1}$, $T_{B\_2}$, $T_{B\_3}$ and $T_{B\_4}$, which are calculated using ratios of the traveling path distances $L_{B\_1}$, $L_{B\_2}$, $L_{B\_3}$ and $L_{B\_4}$ from the respective feature points 270 to the estimated collision point 260, to the traveling speed $V_B$ of the target vehicle 220. The second arrival time values $T_{B\_1}$, $T_{B\_2}$, $T_{B\_3}$ and $T_{B\_4}$ may be expressed using the following Equation 2.

$$T_{B-1} = \frac{L_{B-1}}{V_B},\ T_{B-2} = \frac{L_{B-2}}{V_B},\ T_{B-3} = \frac{L_{B-3}}{V_B},\ T_{B-4} = \frac{L_{B-4}}{V_B} \quad \text{Equation 2}$$

Moreover, as shown in FIG. 4B, when the overall length of the target vehicle 222 is greater than a predetermined length, for example, in the case of a bus, a truck or the like, at least one interpolation point 5 and 6 may be set in addition to feature points 272 with respect to the respective corners 1, 2, 3 and 4 of the target vehicle 222. In the case of a large vehicle such as a bus, a truck or the like, when a risk of collision between the host vehicle 210 and the large vehicle is determined by extracting only the feature points 272 with respect to the four corners of the large vehicle, the possibility of collision with the middle portion of the large vehicle may not be excluded. For example, the host vehicle 210 may recognize the front corners 1 and 4 of the target vehicle 222 as a preceding vehicle, and may recognize the rear corners 2 and 3 of the target vehicle 222 as a following vehicle.

Accordingly, the host vehicle 210 may collide with a portion of the target vehicle 222, which corresponds to a region between the front corners 1 and 4 of the target vehicle 222 and the rear corners 2 and 3 thereof.

Therefore, the controller 140 may be configured to additionally set at least one interpolation point 5 and 6 based on the size or overall length of the target vehicle 222. Particularly, the interpolation point 5 or 6 may be calculated through linear interpolation by applying a predetermined weight value to the location coordinates between the corners arranged in the heading direction of the target vehicle 222, e.g. between the front corner 1 or 4 and the rear corner 2 or 3.

In one example, referring to FIG. 4B, a table 280 in which the location coordinates of the interpolation points 5 and 6, calculated through linear interpolation using a weight value of 0.5, are recorded is shown. However, this is merely illustrative. The weight value may be set within the range from 0 to 1 based on the size of the target vehicle 222. Further, the controller 140 may be configured to additionally calculate a traveling path distance $L_{B\_5}$ and $L_{B\_6}$ from the at least one interpolation point 5 and 6 to the estimated collision point 260 or a second arrival time $T_{B\_5}$ and $T_{B\_6}$ to determine a risk of collision with the at least one interpolation point 5 and 6.

Referring back to FIG. 4A, when the first arrival time $T_A$ of the host vehicle 210 and the second arrival time values $T_{B\_1}$, $T_{B\_2}$, $T_{B\_3}$ and $T_{B\_4}$ of the target vehicle 220 are calculated, the controller 140 may be configured to determine a risk of collision based on an absolute value of a difference between the first arrival time and each of the second arrival time values. Specifically, it may be possible to determine a risk of collision of the host vehicle 210 with each of the corners 1, 2, 3 and 4 of the target vehicle 220 using an absolute value |TG| (hereinafter, referred to as an "arrival time gap") of a difference between the first arrival time $T_A$ and each of the second arrival time values $T_{B\_1}$, $T_{B\_2}$, $T_{B\_3}$ and $T_{B\_4}$. The arrival time gaps $|TG_{AB\_1}|$, $|TG_{AB\_2}|$, $|TG_{AB\_3}|$ and $|TG_{AB\_4}|$ of the host vehicle 210 with respect to each of the corners 1, 2, 3 and 4 of the target vehicle 220 may be expressed using the following Equation 3.

$$|TG_{AB-1}|=|T_A-T_{B-1}|, |TG_{AB-2}|=|T_A-T_{B-2}|, |TG_{AB-3}|=|T_A-T_{B-3}|, |TG_{AB-4}|=|T_A-T_{B-4}| \quad \text{Equation 3}$$

A risk of collision of the host vehicle 210 with each of the corners 1, 2, 3 and 4 of the target vehicle 220 may vary based on the magnitude of each arrival time gap |TG|. For example, the smaller the arrival time gap |TG|, the greater the possibility of collision between the host vehicle 210 and the target vehicle 220. The larger the arrival time gap |TG|, the smaller the possibility of collision between the host vehicle 210 and the target vehicle 220.

Therefore, the controller 140 may be configured to determine a risk of collision based on the minimum value $|TG_{AB}|$ of the arrival time gaps of the host vehicle 210 with respect to the respective corners 1, 2, 3 and 4 of the target vehicle 220. The minimum value $|TG_{AB}|$ of the arrival time gaps may be expressed using the following Equation 4.

$$|TG_{AB}|=\min[|TG_{AB-1}|, |TG_{AB-2}|, |TG_{AB-3}|, |TG_{AB-4}|] \quad \text{Equation 4}$$

Further, the controller 140 may be configured to determine whether to allow the host vehicle 210 to enter the roundabout 230 by comparing the minimum value $|TG_{AB}|$ of the arrival time gaps of the host vehicle 210 with respect to the respective corners 1, 2, 3 and 4 of the target vehicle 220 and a predetermined first reference value $T_{th\_1}$ with each other. For example, when the calculated minimum value $|TG_{AB}|$ is greater than the first reference value $T_{th\_1}$ ($|TG_{AB}|>T_{th\_1}$), the controller 140 may be configured to allow the host vehicle 210 to enter the roundabout 230. When the calculated minimum value $|TG_{AB}|$ is less than the first reference value $T_{th\_1}$ ($|TG_{AB}|<T_{th\_1}$), the controller 140 may be configured to prohibit the host vehicle 210 from entering the roundabout 230 by operating the vehicle in a manner that avoids entering the roundabout.

Particularly, when the controller 140 prohibits the host vehicle 210 from entering the roundabout 230, the controller 140 may be configured to determine deceleration or stoppage of the host vehicle 210 by comparing the minimum value $|TG_{AB}|$ and a predetermined second reference value $T_{th\_2}$, which is different from the first reference value $T_{th\_1}$, with each other. For example, when the minimum value $|TG_{AB}|$ is less than the first reference value $T_{th\_1}$ and greater than the second reference value $T_{th\_2}$ ($T_{th\_1}>|TG_{AB}|>T_{th\_2}$), the controller 140 may be configured to generate a deceleration control command. When the minimum value $|TG_{AB}|$ is less than the second reference value $T_{th\_2}$ ($T_{th\_2}>|TG_{AB}|$), the controller 140 may be configured to generate a stop control command. The driving unit 150 may thus be configured to execute a braking operation in response to the control command.

As described above, the controller 140 may be configured to generate a driving strategy of a vehicle (e.g. traveling control for avoiding a collision with a target vehicle when entering a roundabout) differently based on the determined risk of collision. Alternatively, the controller 140 may be configured to determine whether to allow the host vehicle 210 to enter the roundabout 230 based on a yield strategy established in consideration of traffic rules indicating which vehicle traveling through the roundabout 230 has priority. However, even when the target vehicle 220 has priority, if the possibility of collision is extremely low, the controller 140 may be configured to allow the host vehicle 210 to enter the roundabout in terms of traffic congestion mitigation.

For example, when the target vehicle 220 is a vehicle traveling through the roundabout 230, the controller 140 may be configured to calculate the minimum value of the second arrival time values $T_{B\_1}$, $T_{B\_2}$, $T_{B\_3}$ and $T_{B\_4}$. When the calculated minimum value is less than a predetermined third reference value $T_{th\_3}$, the controller 140 may be configured to generate a stop control command. When the calculated minimum value is greater than the third reference value $T_{th\_3}$, the controller 140 may be configured to allow the host vehicle 210 to enter the roundabout 230 (e.g., not interrupt vehicle operations to divert the vehicle from the roundabout).

Figure 5:
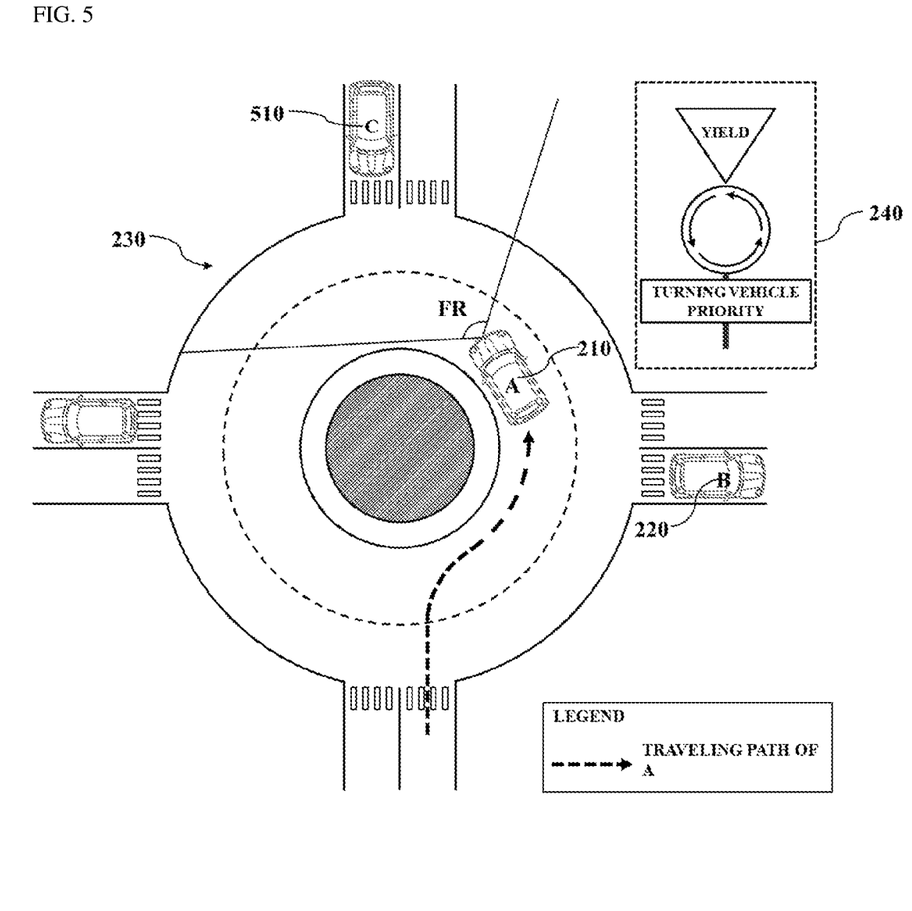
FIG. 5 is a view showing the situation after a vehicle enters a roundabout according to an exemplary embodiment of the present invention.

Hereinafter, a method of determining a risk of collision and establishing a traveling strategy when the traveling state of the host vehicle 210 shown in FIGS. 2 and 3 is changed as the host vehicle 210 enters the roundabout 230 (e.g. a transition from an anticipated roundabout entry state to a roundabout traveling state) will be described with reference to FIG. 5. FIG. 5 is a view showing the situation after the vehicle enters a roundabout according to an exemplary embodiment of the present invention.

The sensor unit 130 may be configured to sense at least one target vehicle (C) 510, which is expected to enter the roundabout 230 within a predetermined forward range FR (e.g., a predetermined distance ahead of the host vehicle) of the host vehicle (A) 210, using at least one of the sensors 132, 134 and 136. In response to sensing at least one target vehicle (C) 510 that is expected to enter the roundabout 230, the controller 140 may be configured to determine a risk of collision between the host vehicle 210 and the target vehicle 510, and adjust the speed of the host vehicle 210 in response to the determined risk of collision.

Particularly, the determination of the risk of collision may be realized in the same manner as described above with reference to FIGS. 3 and 4A-4B. In other words, an estimated collision point 260 may be calculated based on the location information of the host vehicle 210 and the traveling information of the target vehicle 510, and the risk of collision may be determined based on an absolute value of a difference between a first arrival time of the host vehicle 210 to the calculated estimated collision point 260 and a second arrival time of the target vehicle 510 to the calculated estimated collision point 260.

The controller 140 may be configured to determine whether to decelerate or brake the host vehicle 210 traveling through the roundabout 230 by comparing the minimum value $|TG_{AC}|$ of the arrival time gaps of the host vehicle 210 with respect to the respective corners (not shown) of the target vehicle 510 and a predetermined fourth reference value $T_{th\_4}$ with each other. For example, when the calculated minimum value $|TG_{AC}|$ is greater than the fourth reference value $T_{th\_4}$ ($|TG_{AC}|>T_{th\_4}$), the controller 140 may be configured to prohibit the host vehicle 210 from decelerating or braking at the roundabout 230. When the calculated minimum value $|TG_{AC}|$ is less than the fourth reference value $T_{th\_4}$ ($|TG_{AC}|<T_{th\_4}$), the controller 140 may be configured to generate a control command for decelerating or braking the host vehicle 210 traveling through the roundabout 230.

The fourth reference value $T_{th\_4}$ may be less than the first reference value $T_{th\_1}$, which is a criterion used to determine a risk of collision when the host vehicle 210 enters the roundabout. In particular, the host vehicle 210 has priority according to traffic regulations when the traveling state of the host vehicle 210 changes from an anticipated roundabout entry state to a roundabout traveling state. When the target vehicle 510 enters the roundabout 230 within the forward range of the host vehicle 210 while the controller 140 performs deceleration or braking control of the host vehicle 210 due to the high possibility of collision, the controller 140 may be configured to adjust the speed of the host vehicle 210 so that the host vehicle 210 follows the target vehicle 510 while maintaining a predetermined distance from the target vehicle 510.

As described above, the controller 140 may be configured to generate a driving strategy of a vehicle (e.g. traveling control for avoiding a collision with a target vehicle when traveling through a roundabout) differently based on the determined risk of collision. When the host vehicle 210 is intended to exit the roundabout 230, the driving strategy may vary based on the traffic lane in which the host vehicle 210 is traveling.

For example, when the host vehicle 210 is traveling in the outside lane of the roundabout 230, the host vehicle 210 may be configured to generate a roundabout exit route, and may exit the roundabout by travelling along the exit route. When the host vehicle 210 is not traveling in the outside lane of the roundabout 230, the host vehicle 210 may change to the outside lane within a predetermined distance from the exit boundary line of the roundabout 230, and then exit the roundabout 230.

Figure 6:
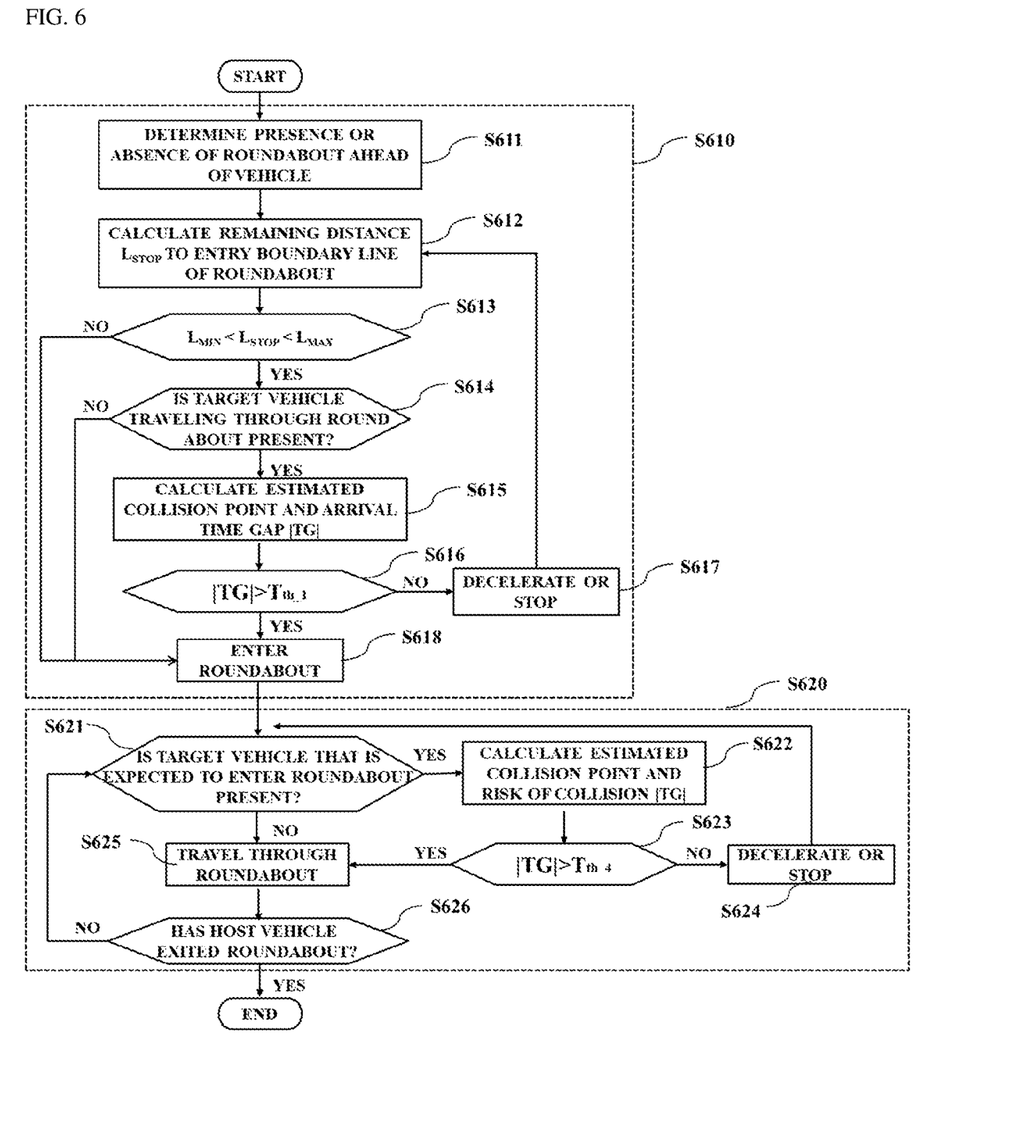
FIG. 6 is a flowchart showing a collision avoidance control method according to an exemplary embodiment of the present invention.

Hereinafter, a collision avoidance control method according to an exemplary embodiment of the present invention will be described with reference to FIG. 6. FIG. 6 is a flowchart showing a collision avoidance control method according to an exemplary embodiment of the present invention. As shown in FIG. 6, the collision avoidance control method according to an exemplary embodiment of the present invention may be divided into a method in a situation before the host vehicle enters the roundabout (S610) and a method in a situation after the host vehicle enters the roundabout (S620).

First, the collision avoidance control method in the situation before the host vehicle enters the roundabout (S610) will now be described. The controller 140 may be configured to determine the presence or absence of the roundabout 230 ahead of the host vehicle 210 by applying the current location information of the host vehicle 210, which is received from the GPS receiver 110 at predetermined time intervals, to the map information extracted from the navigation system 120 (S611) (e.g., the received location information is compared with the extracted map information). In response to determining that the roundabout 230 is present ahead of the host vehicle 210, the controller 140 may be configured to calculate a remaining distance $L_{stop}$ between the current location of the host vehicle 210 and the entry boundary line STOP_LINE of the roundabout 230 (S612).

Thereafter, the controller 140 may be configured to determine whether the remaining distance $L_{stop}$ falls within a predetermined region 250 that is spaced apart from the entry boundary line STOP_LINE of the roundabout 230 by a distance equal to or greater than a first distance $L_{min}$ and equal to or less than a second distance $L_{max}$ (S613). The first distance $L_{min}$ may be a minimum margin distance for assuring a safe distance, and the second distance $L_{max}$ may be a distance calculated based on the average time required for the controller 140 to determine a risk of collision and establish a driving strategy and based on the speed of the host vehicle 210. The second distance $L_{max}$ may be additionally set based on the overall length of the host vehicle 210. However, the present invention is not limited thereto.

When the remaining distance $L_{stop}$ is within the predetermined region 250 (YES in S613), the controller 140 may be configured to reduce the speed of the host vehicle 210 to a predetermined level or less, and the sensor unit 130 may be configured to sense whether at least one target vehicle 220 is traveling through the roundabout 230 within a predetermined forward range FR of the host vehicle 210 through at least one of the sensors 132, 134 and 136 (S614).

When the remaining distance $L_{stop}$ is less than the first distance $L_{min}$ (NO in S613) or when no target vehicle is sensed (NO in S614), the controller 140 may be configured to allow the host vehicle 210 to enter the roundabout 230 (S618). However, when at least one target vehicle 220 is sensed (YES in S614), the controller 140 may be configured to calculate an estimated collision point 260 using a point at which the traveling path of the host vehicle 210 and the traveling path of the target vehicle 220 meet or intersect, and may be configured to calculate an arrival time gap $|TG|$, which is an absolute value of a difference between a first arrival time of the host vehicle 210 to the estimated collision point 260 and a second arrival time of the target vehicle 220 to the estimated collision point 260 (S615).

Thereafter, the controller 140 may be configured to determine whether to allow the host vehicle 210 to enter the roundabout 230 by comparing the calculated arrival time gap $|TG|$ and a first reference value $T_{th\_1}$ with each other (S616). When the calculated arrival time gap $|TG|$ is less than the first reference value $T_{th\_1}$ ($|TG|<T_{th\_1}$) (NO in S616), the controller 140 may be configured to prohibit the host vehicle 210 from entering the roundabout 230, and generate a deceleration or stop control command (S617). When the calculated arrival time gap $|TG|$ is greater than the first reference value $T_{th\_1}$ (|TG|>$T_{th\_1}$) (YES in S616), the controller 140 may be configured to allow the host vehicle 210 to enter the roundabout 230 (S618).

Hereinafter, the collision avoidance control method in the situation after the host vehicle enters the roundabout (S620) will be described. The sensor unit 130 may be configured to sense whether at least one target vehicle 510 is expected to enter the roundabout 230 within a predetermined forward range FR of the host vehicle 210 through at least one of the sensors 132, 134 and 136 (S621). When no target vehicle is sensed (NO in S621), the host vehicle 210 may continuously travel through the roundabout 230 (S625).

Further, when at least one target vehicle 510 is sensed (YES in S621), the controller 140 may be configured to calculate an estimated collision point using a point at which the traveling path of the host vehicle 210 and the traveling path of the target vehicle 510 meet, and may be configured to calculate an arrival time gap |TG|, which is an absolute value of a difference between a first arrival time of the host vehicle 210 to the estimated collision point and a second arrival time of the target vehicle 510 to the estimated collision point (S622).

Thereafter, the controller 140 may be configured to determine whether to decelerate or brake the host vehicle 210 traveling through the roundabout 230 by comparing the calculated arrival time gap |TG| and a fourth reference value $T_{th\_4}$ with each other (S623). When the calculated arrival time gap |TG| is less than the fourth reference value $T_{th\_4}$ (|TG|<$T_{th\_4}$) (NO in S623), the controller 140 may be configured to generate a control command for decelerating or braking the host vehicle 210 traveling through the roundabout 230 (S624). When the calculated arrival time gap |TG| is greater than the fourth reference value $T_{th\_4}$ (|TG|>$T_{th\_4}$) (YES in S623), the controller 140 may be configured to prohibit the host vehicle 210 from decelerating or braking at the roundabout 230 (S625). Thereafter, the controller 140 may be configured to determine whether the host vehicle 210 has exited the roundabout 230 (S626).

When the host vehicle 210 has not exited the roundabout 230 (NO in S626), the process may return to S621, where the sensor unit 130 may be configured to sense whether at least one target vehicle 510 is expected to enter the roundabout 230 within a predetermined forward range FR of the host vehicle 210. When the host vehicle 210 has exited the roundabout 230 (YES in S626), the collision avoidance control method for traveling through a roundabout according to an exemplary embodiment of the present invention may be terminated.

The collision avoidance control method according to an exemplary embodiment described above may be programmed to be executed in a computer and may be stored on a non-transitory computer-readable recording medium. Examples of the non-transitory computer-readable recording medium include read-only memory (ROM), random-access memory (RAM), CD-ROMs, magnetic tapes, floppy disks, and optical data storage devices.

The non-transitory computer-readable recording medium may also be distributed over network-coupled computer systems so that the computer-readable code is stored and executed in a distributed fashion. Also, functional programs, code, and code segments for accomplishing the above-described method can be easily construed by programmers skilled in the art to which the present disclosure pertains.

Although only a limited number of exemplary embodiments have been described above, various other exemplary embodiments are possible. The technical contents of the above-described exemplary embodiments may be combined into various forms as long as they are not incompatible with one another, and thus may be implemented in new embodiments. The collision avoidance control system and method according to the exemplary embodiment described above may be applicable not only to a roundabout but also to a general intersection at which no traffic light is present or traffic lights abnormally flicker or at which permitted left-turn is possible.

As is apparent from the above description, the present invention provides a system and method for avoiding a collision when a vehicle enters or travels through a roundabout by determining a risk of collision between the vehicle and other vehicles regardless of support of a V2X network function. In addition, it may be possible to effectively prevent a vehicle collision at a roundabout and to improve traffic flow by establishing a driving strategy of the vehicle differently based on the determined risk of collision.

It will be appreciated by those skilled in the art that the effects achievable through the present invention are not limited to those that have been specifically described hereinabove, and other effects of the present invention will be more clearly understood from the above detailed description.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A collision avoidance control system, comprising:
   a global positioning system (GPS) receiver configured to obtain location information of a vehicle;
   a navigation system in which map information is stored;
   a controller configured to receive the location information of the vehicle and the map information from the GPS receiver and the navigation system; and
   a sensor unit configured to sense at least one target vehicle located adjacent to a roundabout and to obtain traveling information of the target vehicle, including at least one of a distance to the target vehicle, a location of the target vehicle, or a speed of the target vehicle, and forward view image information of the vehicle,
   wherein the controller is configured to calculate an estimated collision point based on the map information, the location information of the vehicle and the traveling information of the target vehicle, determine a risk of collision based on an absolute value of a difference between a first arrival time of the vehicle to the calculated estimated collision point and a second arrival time of the target vehicle to the calculated estimated collision point, and adjust a speed of the vehicle in response to the determined risk of collision, and
   wherein the controller is configured to:
   extract a plurality of feature points with respect to respective corners of the target vehicle from image information obtained from the sensor unit; and
   calculate a plurality of second arrival time values required for the extracted plurality of feature points to reach the estimated collision point.

2. The collision avoidance control system according to claim 1, wherein the controller is configured to:

estimate a traveling path of the vehicle and a traveling path of the target vehicle based on the map information; and calculate the estimated collision point using a point at which the traveling path of the vehicle and the traveling path of the target vehicle meet.

3. The collision avoidance control system according to claim 1, wherein, when the target vehicle has an overall length greater than a predetermined length, the controller is configured to:

calculate at least one interpolation point through linear interpolation with respect to the extracted plurality of feature points; and calculate a plurality of second arrival time values required for the extracted plurality of feature points and the calculated at least one interpolation point to reach the estimated collision point.

4. The collision avoidance control system according to claim 1, wherein the risk of collision is determined based on a minimum value of absolute values of differences between the second arrival time values and the first arrival time.

5. The collision avoidance control system according to claim 4, wherein, when the target vehicle is traveling through the roundabout, the controller is configured to:

determine whether the roundabout is present ahead of the vehicle by comparing the location information, received from the GPS receiver at predetermined time intervals, to the map information extracted from the navigation system.

6. The collision avoidance control system according to claim 5, wherein the controller is configured to determine the risk of collision when the vehicle is located within a region spaced apart from an entry boundary line of the roundabout by a predetermined distance.

7. The collision avoidance control system according to claim 5, wherein the controller is configured to allow the vehicle to enter the roundabout when the minimum value is greater than a predetermined first reference value.

8. The collision avoidance control system according to claim 5, wherein the controller is configured to prohibit the vehicle from entering the roundabout when the minimum value is less than a predetermined first reference value.

9. The collision avoidance control system according to claim 4, wherein, when the target vehicle is expected to enter the roundabout, the controller is configured to decelerate or brake the vehicle traveling through the roundabout when the minimum value is less than a predetermined second reference value, and wherein the second reference value is less than a first reference value, the first reference value being a criterion used to determine the risk of collision when the vehicle enters the roundabout.

10. A collision avoidance control method, comprising:

receiving, by a controller, map information and location information of a vehicle;

sensing, by the controller, at least one target vehicle located adjacent to a roundabout and receiving traveling information of the target vehicle, including at least one of a distance to the target vehicle, a location of the target vehicle, or a speed of the target vehicle, and forward view image information of the vehicle using at least one sensor installed within the vehicle;

calculating, by the controller, an estimated collision point based on the map information, the location information of the vehicle and the traveling information of the target vehicle;

determining, by the controller, a risk of collision based on an absolute value of a difference between a first arrival time of the vehicle to the calculated estimated collision point and a second arrival time of the target vehicle to the calculated estimated collision point; and adjusting, by the controller, a speed of the vehicle in response to the determined risk of collision, wherein the determining of the risk of collision includes:

extracting by the controller, a plurality of feature points with respect to respective corners of the target vehicle from image information obtained from the sensor; and calculating, by the controller, a plurality of second arrival time values required for the extracted plurality of feature points to reach the estimated collision point.

11. The collision avoidance control method according to claim 10, wherein the calculating of the estimated collision point includes:

estimating, by the controller, a traveling path of the vehicle and a traveling path of the target vehicle based on the map information; and calculating, by the controller, the estimated collision point using a point at which the traveling path of the vehicle and the traveling path of the target vehicle meet.

12. The collision avoidance control method according to claim 10, wherein the determining of the risk of collision includes:

when the target vehicle has an overall length greater than a predetermined length, calculating, by the controller, at least one interpolation point through linear interpolation with respect to the extracted plurality of feature points; and calculating, by the controller, a plurality of second arrival time values required for the extracted plurality of feature points and the calculated at least one interpolation point to reach the estimated collision point.

13. The collision avoidance control method according to claim 10, wherein the determining of the risk of collision includes determining, by the controller, the risk of collision based on a minimum value of absolute values of differences between the second arrival time values and the first arrival time.

14. The collision avoidance control method according to claim 13, further comprising:

when the target vehicle is traveling through the roundabout, determining, by the controller, whether the roundabout is present ahead of the vehicle by comparing the location information, received at predetermined time intervals, to the map information.

15. The collision avoidance control method according to claim 14, wherein the determining of the risk of collision further includes determining, by the controller, the risk of collision when the vehicle is located within a region spaced apart from an entry boundary line of the roundabout by a predetermined distance.

16. The collision avoidance control method according to claim 14, wherein the adjusting of the speed of the vehicle includes allowing, by the controller, the vehicle to enter the roundabout when the minimum value is greater than a predetermined first reference value.

17. The collision avoidance control method according to claim 13, wherein, when the target vehicle is expected to enter the roundabout, the adjusting of the speed of the vehicle includes decelerating or braking, by the controller, the vehicle traveling through the roundabout when the minimum value is less than a predetermined second reference value, and wherein the second reference value is less than a first reference value, the first reference value being a criterion used to determine the risk of collision when the vehicle enters the roundabout.

18. A non-transitory computer-readable recording medium having recorded therein a program for causing a computer to execute the collision avoidance control method disclosed in claim 10.

\* \* \* \* \*